Aug. 12, 1969    J. E. COMPARETTO    3,460,970
CHROMATOGRAPHIC PLATE AND METHOD OF MAKING SAME
Filed June 20, 1967

INVENTOR
JOHN E. COMPARETTO

United States Patent Office 3,460,970
Patented Aug. 12, 1969

3,460,970
CHROMATOGRAPHIC PLATE AND
METHOD OF MAKING SAME
John E. Comparetto, 120 Riverside Gardens,
Hackettstown, N.J. 07840
Filed June 20, 1967, Ser. No. 647,375
Int. Cl. B44d 1/40
U.S. Cl. 117—69                                              12 Claims

ABSTRACT OF THE DISCLOSURE

A thin-layer chromatographic plate and a method for its preparation are provided having an outer, protective coating layer superimposed on its aqueous thin-layer gel. The protective layer is constructed of materials such as trimethylolpropane; 2,2-diethyl-1,3-propanediol; 2-methyl-1,2-propyl-1,3-propanediol; 1,3-dihydroxy-2-propanone; 4-hydroxy-4-methyl-2-pentanone; and N-acetylethanolamine. The protective layer protects the gel layer from drying and from damage in handling, and can be removed readily during equilibration of the plate.

---

This application relates to the preparation of chromatographic plates. More particularly, it relates to a process for the preparation of gel-coated chromatographic plates useful in thin-layer chromatographic analysis techniques, and to the plates produced by this process.

One of the most important modern techniques for composition separation and analysis, and particularly for the analysis of mixtures of closely related materials, is "thin-layer" chromatography. This designation is derived from the technique's use of an apparatus comprising a thin layer of a molecular sieving gel material coated on an inert base. The mixture of materials to be analyzed is separated into its components by means of the different migration times of the various components through the layer of gel in a solvent used as a mobile phase.

The gel in the aqueous state "sieves" the substances being analyzed according to their molecular dimension. The separation of substances is made when the substances differ in molecular size. The molecular size of the components of the mixture being analyzed generally parallels molecular weight, although stearic considerations may also affect molecular size, i.e., a very long stranded molecule will be stearically hindered to a greater degree in the same gel system than a round symmetrical molecule of equal molecular weight.

According to their molecular size the various components enter into gel matrix apertures or pores to varying degrees, with the largest molecules entering only slightly, if at all, and smaller molecules entering to the limits of their particular sizes. The molecules of different dimensions will migrate through the gel sequentially, with the largest molecules coming off first and the smallest last.

While the use of gel-coated chromatographic plates has a number of advantages over earlier developed chromatographic techniques, certain troublesome problems have arisen in the use of these thin-layer plates. The gels prepared from dextran, polyacrylamide, glass beads and the like are aqeous in nature when swollen and ready for use, and if storage of such plates is attempted, there is a tendency for water to evaporate from the thin-layer gel, leaving the dried gel in a cracked, flaky condition. Further, the thin gel layers are very fragile and can be easily damaged or marred in handling and shipment.

For these reasons it has been customary to prepare the thin-layer films shortly before they are to be used, generally at their place of use. These requirements severely limit the successful and economical mass production of thin-layer plates, since large scale production normally requires centralized production facilities with shipping and storage before use.

Accordingly, it is a primary object of the present invention to provide thin-layer chromatographic plates which can be prepared substantially in advance of their use without problems of the gels drying out, flaking, and cracking before their use.

Another object of this invention is to provide protected, thin-layer, gel-coated, chromatographic plates which have less tendency to dry out on storage and which can be shipped without undue liability to damage or marring.

Still another object of this invention is to provide protected, gel-coated, thin-layer chromatographic plates which have good resistance to gel drying, and can be readily and easily prepared for use.

Yet another broad object of this invention is to provide a process for the preparation of thin-layer chromatographic plates having improved resistance to gel drying, and which can, accordingly, be stored before use without undue deterioration of the gel-layer resulting from its loss of water.

A further object of this invention is to provide a process for producing protected, gel-coated, chromatographic plates which can be prepared a substantial period of time before their use without becoming flaky and cracked as a result of gel-drying, which are not highly susceptible to damage and marring in handling and shipment, and which can be readily and conveniently prepared for use in chromatographic analysis.

Additional objects and advantages of the invention will be set forth in part in the description which follows and in part will be obvious from the description, or may be learned by practice of the invention, the objects and advantages being realized and attained by means of the articles, compositions, methods, processes, and improvements particularly pointed out in the appended claims.

To achieve the foregoing objects, and in accordance with its purpose, as embodied and broadly described, the present invention provides an improvement in a method for preparing a chromatographic plate having an aqueous gel coating applied to its surface, the improvement comprising: applying to the gel-coated plate a thin, outer layer of a protective coating material having the following properties:

(1) Melting point between 55° C. and 110° C. (solid at room temperature); (2) a solvation power approaching that of water (3) neither strongly acidic nor strongly basic; (4) low degree of expansion when going from liquid to solid; (5) preferably non-toxic; said outer coating acting to prevent drying, flaking and cracking of the aqueous gel coating and thereby allowing the chromatographic plate to be prepared substantially in advance of the time of its usage.

This improved method provides the chromatographic plate of this invention, which has an adherent inner coating layer comprising an aqueous gel applied directly to its surface, and an outer coating layer superimposed on the inner coating layer and comprising a protective coating material having the properties outlined above.

It has been found that all of the properties desired in the outer protective coating layer of this invention are afforded by protective coating materials selected from the group consisting of trimethylolpropane; 2,2-diethyl-1,3-propanediol; 2-methyl-1,2-propyl-1,3-propanediol; 1,3-dihydroxy-2-propanone; 4-hydroxy-4-methyl-2-pentanone; and N-acetylethanolamine.

The invention lies in the novel methods, processes, articles, compositions, combinations, and improvements shown and described.

The accompanying drawings, which are incorporated in and constitute a part of this specification, illustrate one embodiment of the invention and, together with the description, serve to explain the principles of the invention.

Figure 1:
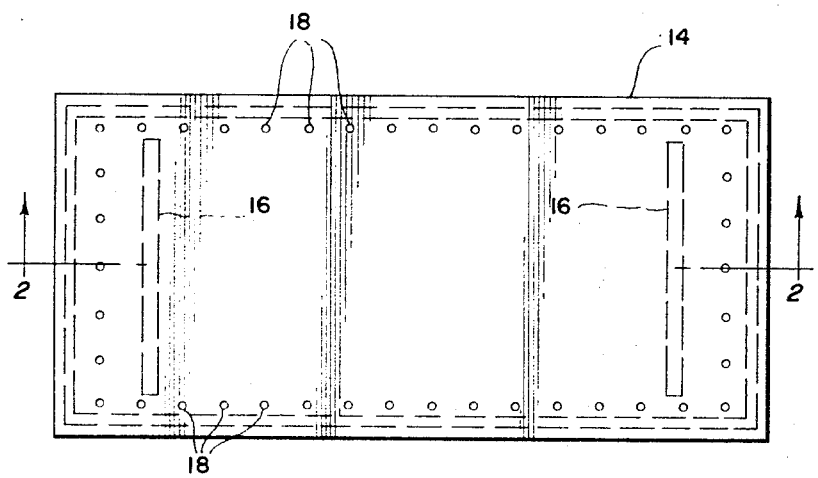
FIG. 1 is a plan view of a coating chamber suitable for use in applying the protective outer layer of the present invention to a thin-layer chromatographic plate.

The present process provides a protective coating layer over the gel-coated, thin-layer chromatographic plate. This protective coating prevents evaporation of the water or solvent from the swollen gel and prevents flowing of the wet gel material from the gel plate and so doing, protects the gel during handling and shipment.

The procedures used for the preparation of gel-coated, thin-layer chromatographic plates are, of course, well known in the art. The plate substrate is an inert material such as glass or a suitable inert plastic which can be surface coated with the swollen gel without rolling up, separating or bubbling. The "thin-layer" gel is uniformly applied to the substrate by spreading with a spatula, roller, or the like, or a conventional mechanical spreading device for thin-layer plates of the type presently on the market. The gel can also be sprayed onto the base plate in a mixture with a suitable diluent used to swell the gel. If the gel is spread on the plate, it is preferably swollen with diluent before its application.

The thin-layer gel can be a polyacrylamide gel, a dextran gel, a glass bead gel, a silica gel or the like. Thin-layer plates of dextran ion exchanger can also be treated in accordance with the invention. Diluents used to swell these gels before their application to the inert plates (or mixed with the gels before spraying) generally comprise aqueous, semi-aqueous, and various polar solvents.

In accordance with the invention, a thin, adherent protective coating is applied to the gel-coated chromatographic plate. This outer coating layer acts to prevent water loss from the gel and resultant gel flaking and cracking, and thereby allows preparation of the chromatographic plate substantially in advance of the time of its usage.

The outer protective coating layer is formed of a material which is a solid at room temperature but can be readily vaporized for application to the gel-coated plate.

The protective coating material must be capable of coating the gel, and of forming a thin, adherent coating layer over the gel. It must be inert when applied to the gel and should not react with or interfere with the normal properties of the gel material. For example, it should not have a melting point so high that the gel material is affected by contact with the protective coating in molten form. Further, the material should not form unduly large crystals of such a configuration that they tend to disrupt the configuration of the gel bed.

The protective coating material should have a low degree of expansion when going from a liquid to a solid phase. It should not have disruptive or ponderous crystal lattices in areas which are in contact with the gel.

The protective coating materials of this invention have melting points of at least about 55° C., and preferably between about 55° C. and 110° C. They are water soluble in all proportions, and highly soluble in most solvents used as the mobile phase in thin-layer chromatography techniques. These protective materials also have a high solvation power, nearer that of water, ethylene glycol, formamide and the like.

These solubility and solvation characteristics are most important to the protective coating materials of this invention, in that they allow the protective coating layer to be removed by treatment with either water or the particular solvent to be used in the chromatographic analysis at hand. Thus, removal of the protective layer can be readily and conveniently accomplished.

The protective coating materials of this invention are also characterized by being neither strongly basic nor strongly acidic; by having a low expansion on going from liquid to solid; and, preferably, by being non-toxic.

It has been found that all of the foregoing requirements for the protective coating compositions of this invention are provided by a group of materials comprising trimethylolpropane; 2,2 - diethyl - 1,3-propanediol; 2-methyl-1,2-propyl-1,3-propanediol; 1,3-dihydroxy-2-propanone; 4-hydroxy-4-methyl-2-pentanone; and N-acetylethanolamine. Each of these materials, when applied to a gel-coated thin-layer plate forms a firm, protective coating which has good adherence to the gel, which does not interfere with the normal properties of the gel, and which can be readily removed from the gel by treatment with water or conventional solvents used in thin-layer chromatographic procedures.

The polyhydroxyl alcohols included in this group of protective coating materials, i.e., trimethylolpropane; 2,2-diethyl-1,3-propanediol; 2-methyl-1,2-propyl-1,3-propanediol; and 1,3-dihydroxy-2-propanone, are preferred.

In accordance with the process of this invention, the protective coating material is applied to the gel-coated plate in vapor form. Thus the protective coating material can be applied to the plate by ultrasonic atomization and spraying by the use of an ultrasonic transducer or the like, as an aerosol, or in liquid form as thin atomized droplets. The coating is preferably applied by contacting the gel-coated plate with vapors generated from a boiling or near-boiling reservoir of the coating material.

The vapors should be applied to the gel-coated plate in an enclosed chamber, and a thin, protective film of the coating material thus forms on the plate as a result of condensation of vapors of the coating material on the gel material previously applied to the plate. These vapors are, of course, generated by heating the coating material at about its boiling point.

Figure 2:
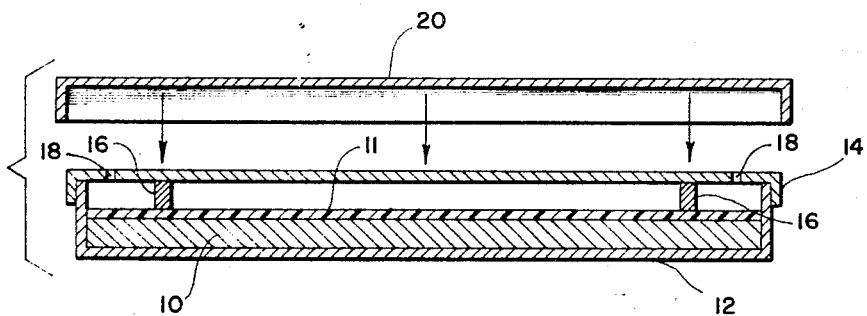
FIG. 2 is a partial sectional view taken along line 2—2 of FIG. 1.

A presently preferred form of the process of the present invention is illustrated in the accompanying drawings. Referring to FIG. 2, an inert chromatographic plate 10, having a gel coating layer 11 applied to its surface, is inserted into an air tight container 12 and sealed by fitting lid 14 onto container 12. Lid 14 is provided with internal rims or pegs 16 which are designed to hold glass plate 10 near the bottom of container 12.

It is to be understood that rims 16 could be replaced with a series of pegs or any other suitable means for retaining the plate in the desired position, and that container 12 can be round or of any other desired shape to comport with the configuration of the chromatographic plates to be treated. Thus, the gel is desirably treated in its commercial package, sealed and ready for sale. Air tightness is most desirable but absolute air tightness is not essential to satisfactory treatment of the plates.

As shown in FIG. 2, lid 14 is preferably provided with a series of perforations 18 for entry of the vaporous coating material into container 12. These perforations can be located at any suitable points on the lid, but are preferably near the outer edges of the lid, as shown in the drawing. The provision of perforations 18 near the edges of lid 14 is highly desirable since it assists in the achievement of a uniform vapor concentration at all the edges of the gel bed, where there is the greatest stress on the gel layer due to the exposed edge.

It will, of course, be understood that the apparatus illustrated in the accompanying drawings is merely illustrative, and any enclosure-type device which achieves a sufficient exposure of the gel surface to the protective coating vapors to allow formation of the protective layer can be substituted for the particular device illustrated.

There is a tendency of the protective coating layer to pull away from the plate near the edges, and thus it is necessary to ensure a uniform vapor deposition near these edges. For this reason, it is preferred to form a thicker coating layer near the edges of the plate than in the remaining portions of the plate. Alternately, a glass flange can be provided around the edge of the gel-coated plate to protect the vulnerable edges of the gel.

After the vaporous coating material is supplied to plate 10 through perforations 18, by evaporation from a heated reservoir of the coating material, by ultrasonic atomization or by any other suitable means which will be readily apparent to those skilled in the art, the perforations are sealed, such as by applying a second, continuous lid 20 over the top of lid 14, to retain the vapors in air tight container 12. The vapors have condensed on plate 10 to form the desired protective outer layer. It will be appreciated that any equivalent sealing means such as sliding closures on lid 14 can be substituted for second lid 20 shown in FIG. 2.

Another satisfactory method for forming the protective coating would be to maintain the plate in an open container where it is exposed to vapors of the coating material contained within a larger chamber which also contains the gel-coated plate. The smaller container could then be sealed within the vapor environment and removed only after it is sealed to ensure deposition of the coating material. The gel coating must be carried out in an air tight, semi-air tight, vapor laden, or vapor suffused atmosphere of coating agent.

The clearance between the gel layer on plate 10 and lid 14 in closed plate container 12 should be kept to a minimum. Thus, it is preferred, but not critical, to have a clearance space between gel-coated plate 10 and lid 14 of about 2 to 3 mm.

The protective layer on the outer surface of the thin-layer chromatographic plate can be provided with a thickness varying from monatomic dimensions to 50 microns or more depending on the tightness of the cover plate and the other process conditions selected.

The protective coating layer of this invention protects the gel-coated thin-layer plate from drying out during storage, and from damage or marring in shipment. When the plate is to be used, this protective layer can be readily removed by placing the plate in the chamber where the chromatographic analysis is to be run, and equilibrating it in the solvent to be used in the analysis. Due to its ready solubility, the protective coating material will be removed during this equilibration. The equilibration of the plate must be carried out before the analysis can be initiated in any event, and thus removal of the protective coating material adds no additional burden.

The protective coating materials used in the present process permeate only the surface and near-surface pores of the thin-layer gel, and even this permeation occurs only to a negligible degree and will not adversely affect the achievement of a completely equilibrated plate. The protective coating material moves down the plate (in the solvent), at only a slightly slower rate than the rate of movement of the equilibration front itself. Normal equilbration times are generally sufficient to remove all traces of the protective coating material from the plate. The researcher can thus initiate his analysis shortly after the equilibration front moves off the plate.

The progress of the equilibration front, and hence of the removal of the protective coating layer, can be determined by applying a small portion of a suitable marking agent, such as blue dextran (Pharmacia AB) to the plate. The marker is placed on the plate soon after the protective coating removal procedure is commenced. This marker will move off the plate as the equilibration front moves off it, since the marker is completely excluded from within the gel as a result of its very large molecular dimensions.

If for any reason a particularly exotic solvent is to be used in the chromatographic analysis, and the coating material is not soluble in this solvent, the plate can be first equilibrated with water to remove the protective coating material, the water then leached out, and the plate again equilibrated, this time with the solvent to be used as the mobile phase in the analysis.

Although the protective coating layers of the present invention greatly improve the resistance of thin-layer chromatographic plates to damage or marring during handling and shipment, it should be noted that even the protected plates should not be subjected to extreme temperatures in shipment and should not be cracked open by rough handling or the like. Thus, at very low temperatures the solvent used to swell the gel coating, or the water present in the aqueous gels may solidify, damaging the over-all plate structure. At very high temperatures, above the meting points of the coatings, the gels are vulnerable to gravitational pull and rough handling, in that they may flow at such highly elevated temperatures. The avoidance of such temperature extremes is therefore desirable.

For a clearer understanding of the invention, specific examples of it are set forth below. These examples are merely illustrative and are not to be understood as limiting the scope and underlying principles of the invention in any way.

Example 1

A glass chromatographic plate, having an adherent 0.5 mm. coating of a dextran gel applied to its surface, is inserted in a container of the type shown in the attached drawings. A lid having perforations around its outer edges is placed on the top of the container, and vapors emitted from a boiling solution of trimethylolpropane are passed through the perforations in the outer edge of the lid to "overwhelm" the atmosphere above the gel-coated plate with such vapors. The perforations are then sealed to maintain an atmosphere of trimethylolpropane above the gel-coated plate. The vapors condense on the plate at contact to form a protective film of trimethylolpropane over the dextran gel layer. This protective film has a thickness of about 40 microns.

After storage for 90 days, the gel coating is found to retain its original form, exhibiting no drying, flaking, or cracking.

Plates treated in a similar manner to provide even very thin protective coatings have never exhibited flaking or cracking of the gel coating, and drying occasionally occurring in such thinly coated plates has always been minor and non-detrimental with rehydration being accomplished on these without distortion of gel layer uniformity.

The trimethylolpropane coated is inserted in a conventional thin-layer chromatographic analysis chamber and equilibrated with an ethanol solution. Shortly after this equilibration is initiated, a blue dextran marker is placed on the plate. After about 30 minutes, the marker has moved completely off the plate, indicating the movement of the equilibration front off of the plate, and the impending completion of the removal of the trimethylolpropane protective coating. The exact speed of coating removal depends in part on the surrounding temperature and the angulation of the plate.

Example 2

The procedure of Example 1 is repeated in this example, except that the vapors brought into contact with the gel-coated plate are generated by heating and vaporizing 2,2-diethyl-1,3-propanediol. The plate so produced has a thin, adherent, outer coating of 2,2-diethyl-1,3-propanediol, and the protected plate exhibits properties substantially the same as those of the plate produced in Example 1.

Example 3

The procedure of Example 1 is again repeated in this example, except that the coating agent is 2-methyl-1,2-propyl-1,3-propanediol. The results obtained are substantially the same as those of Example 1.

In this example the coated plate is equilibrated with water to remove the protective coating layer, and the removal is completed in about 60 minutes, as shown by the movement of the blue dextran marker off the end of the plate.

Example 4

The procedure of Example 1 is again repeated in this example, except that the coating agent is 1,3-dihydroxy-2-propane. The results achieved are substantially the same as those of Example 1.

What is claimed is:

1. In a method for preparing a chormatographic plate having an aqueous gel coating applied to its surface, the improvement which comprises: applying to the gel-coated plate a thin, adherent outer layer of a protective coating material which has a melting point between 55 and 110° C., a solvation power approaching that of water, a low degree of expansion on going from a liquid state to a solid state, low toxicity, and is neither strongly acidic nor strongly basic.

2. The method of claim 1 in which the protective coating material is selected from the group consisting of trimethylolpropane; 2,2-diethyl-1,3-propanediol; 2-methyl-1,2-propyl-1,3-propanediol; 1,3 - dihydroxy-2-propanone; 4 - hydroxy-4-methyl-2-pentanone; and N-acetylethanolamine; said outer coating acting to prevent drying, flaking, and cracking of the aqueous gel coating and thereby allowing the chromatographic plate to be prepared substantially in advance of its usage.

3. The process of claim 2 in which a greater thickness of protective coating material is applied to the area around the edges of the gel-coated plate that is applied to the remainder of the surface of the plate, thereby providing improved adherence of the protective coating to said plate near its outer edges.

4. The process of claim 2 in which the outer protective coating is applied to the gel-coated chromatographic plate by contacting the gel-coated plate with vapors of the protective coating material.

5. The process of claim 4 in which the gel-coated chromatographic plate is contacted with vapors emitted from a boiling or near-boiling protective coating material.

6. A chromatographic plate having an adherent inner coating layer comprising an aqueous gel applied directly to its surface, and an adherent outer coating layer superimposed on said inner coating layer and comprising a protective coating material which has a melting point between 55 and 110° C., a solvation power approaching that of water, a low degree of expansion on going from a liquid state to a solid state, low toxicity, and is neither strongly acidic nor strongly basic.

7. The chromatographic plate of claim 6 in which the protective coating material is selected from the group consisting of trimethylolpropane; 2,2-diethyl-1,3-propanediol; 2-methyl-1,2-propyl-1,3-propanediol; 1,3-dihydroxy - 2 - propanone; 4-hydroxy-4-methyl-2-pentanone; and N-acetylethanolamine.

8. The chromatographic plate of claim 7 in which the aqueous gel is selected from the group consisting of dextran gel, a dextran ion-exchange material, a polyacrylamide gel, a glass bead gel and a silica gel.

9. The chromatographic plate of claim 7 in which the protective coating layer comprises trimethylolpropane.

10. The chromatographic plate of claim 7 in which the protective coating layer comprises 2,2-diethyl-1,3-propanediol.

11. The chromatographic plate of claim 7 in which the protective coating layer comprises 2-methyl-1,2-propyl-1,3-propanediol.

12. The chromatographic plate of claim 7 in which the protective coating layer comprises 1,3-dihydroxy-2-propanone.

References Cited

UNITED STATES PATENTS

| | | | |
|---|---|---|---|
| 2,924,607 | 2/1960 | Pattison | 260—635 |
| 3,259,662 | 7/1966 | Munley | 260—635 |
| 3,298,925 | 1/1967 | Mosbach | 210—31 X |
| 3,303,043 | 2/1967 | Halpaap et al. | 210—198 |

FOREIGN PATENTS

| | | |
|---|---|---|
| 667,189 | 2/1952 | Great Britain. |

OTHER REFERENCES

The Condensed Chemical Dictionary, Seventh Edition, Reinhold Publishing Co., New York, 1966, pp. 10 and 288.

REUBEN FRIEDMAN, Primary Examiner

J. L. DE CESARE, Assistant Examiner

U.S. Cl. X.R.

117—72, 124; 210—198